United States Patent

Smith et al.

[15] 3,673,344

[45] June 27, 1972

[54] HEAD POSITIONING MECHANISM FOR RECORDED ANNOUNCEMENT APPARATUS

[72] Inventors: Leary W. Smith; Ellis H. Bryant, Jr., both of 721 Miami Circle N.E., Atlanta, Ga. 30324

[22] Filed: Dec. 7, 1971

[21] Appl. No.: 205,597

Related U.S. Application Data

[62] Division of Ser. No. 10,386, Feb. 11, 1970.

[52] U.S. Cl. ........................179/100.1 C, 179/6 C, 179/6 TA

[51] Int. Cl. ........................G11b 21/04

[58] Field of Search ..............179/100.1 C, 100.2 T, 100.1 R, 179/100.3 R, 6 TA, 6 C; 274/13 A, 22, 45

[56] References Cited

UNITED STATES PATENTS 2,862,065 11/1958 Franklin ..........................179/100.2 T

*Primary Examiner*—Bernard Konick
*Assistant Examiner*—Raymond F. Cardillo, Jr.
*Attorney*—Jones & Thomas

[57] ABSTRACT

An announcing system for providing a family of recorded announcements through telephone central office equipment to one or more telephone subscriber lines. Each announcement selectively includes weather, temperature, or other periodic and aperiodic information segments. Each announcement is changeable in length from a long cycle which includes a full advertising segment to a short cycle in which a major portion or all of the advertising segment is deleted so that the time required for an announcement is shortened. The length of the announcement cycle is shortened in response to the number of subscriber lines waiting to be connected to the announcing system being in excess of the number of subscriber lines which can be connected to the announcing system by the telephone central office equipment. However, the announcing system also provides for deleting segments of an announcement which are in error without changing the length of the announcement cycle or it being apparent that the announcement segment has been deleted. The weather segment of the announcement is determined by different three digit weather codes and by changing the positions of a plurality of weather announcing heads along a weather announcing drum in response to a plurality of resistances corresponding to the three digit weather codes.

9 Claims, 11 Drawing Figures

Patented June 27, 1972 3,673,344

5 Sheets-Sheet 3

HEAD POSITIONING MECHANISM FOR RECORDED ANNOUNCEMENT APPARATUS

This is a division of application Ser. No. 10,386, filed Feb. 11, 1970.

BACKGROUND OF THE INVENTION

In the past, various announcement systems have been developed with function to broadcast the time of day or temperature together with a message or an advertisement to a telephone system. Also, systems have been developed for announcing both time and temperature with an advertisement.

A typical time announcement machine comprises a rotatable announcement cylinder with minute and hour sections that are rotatable with respect to each other in order that the time announcement can be varied each minute. The arrangement is such that 60-minute recordings are imposed in spiral tracks on the minute section of the announcement cylinder and 12-hour recordings are imposed in spiral tracks on the hour section of the announcement cylinder so that a total of seventy-two time announcements are pre-recorded on the announcement cylinder and the recordings announced by the time machine are sequentially changed each minute by rotating the minute section with respect to the hour section. A reading head moves along the announcement cylinder in the aligned tracks of the sections of the cylinder as the cylinder rotates to broadcast the time announcement.

The typical temperature announcement machines comprises a rotatable announcement cylinder with a series of temperature recordings imposed on its surface in annular tracks, and a reading head engages the recording cylinder and broadcasts the announcement. As the temperature changes the reading head moves to the next adjacent track which has the increased or decreased temperature recording imposed thereon.

Time and temperature announcement machines are relatively straightforward in their arrangement and structure since the time announcement machine changes on a predetermined periodic basis and the temperature announcement machines changes in response to temperature changes and usually in increments of 1 degree, and both systems utilize a single reading head with a relatively small number of recordings carried by the announcement cylinder; however, since the various possible weather combinations that frequently occur are so many in number and since no system for changing the weather announcement had been developed, no system has successfully announced weather forecasts.

The U.S. Weather Bureau uses an abbreviated forecast matrix which consists of groups of three numbers that correspond to various weather forecast messages. The most frequent weather conditions have been inserted into the matrix so that for most given weather conditions a number code can be developed. The first number of the number code indicates the present weather condition, the second number indicates the forecast weather condition, and the third number indicates the temperature trend for the forecast. The details of the forecast matrix are published in Operations Manual Letter 69–25 of the U.S. Weather Bureau. An example of the three-number code would be the numbers 222, which indicate "Cloudy Today, Cloudy and Cooler Tonight." The matrix for the code includes 10 numbers for the first digit, 10 numbers for the second digit and nine numbers for the third digit. This effectively provides 900 combinations of possible announcements. In addition, when the third number reaches the 10th digit or zero, a series of special messages are provided. While the special messages developed by the Weather Bureau are only 73 in number, the matrix provides a capacity for 100 special messages. Thus the capacity of the matrix is 1000 weather forecast messages. An example of a special message is "Tornado Warning, Listen to Radio for Details."

Because of the large number of weather forecast messages developed by the Weather Bureau, if a typical time or temperature announcing system was modified in an attempt to carry all of these announcements, the announcement cylinder would have to have approximately 10 times its usual capacity, and the reading head would be forced to travel extended distances along the length of the announcement cylinder when changing weather forecast announcements. Thus, the use of the previously known time or temperature recording systems is not readily adaptable to the weather forecast matrix. Moreover, while existing announcement systems might possibly be modified to be compatible with the weather forecast matrix, such a system would not function automatically as the time or temperature systems do since no automatic announcement change facilities have been developed for changing the weather announcements in response to changes in weather conditions.

SUMMARY OF THE INVENTION

Briefly described the present invention comprises a variable announcement system for sequentially broadcasting the time of day, the present and forecast weather, conditions and the present temperature to a telephone system. In addition an advertising announcement is added to the system and the system functions to eliminate a major portion of the advertising announcement during high traffic load on the telephone equipment. This functions to shorten the announcement duration and increase the capacity of the announcement system to handle more telephone calls. The announcement system comprises a family of announcement machines, including a time announcement machine, a weather announcement machine and a temperature announcement machine. The time announcement machine carries the advertisement and functions to change the time announcement every minute; the temperature announcement machine functions to change its temperature announcement in response to increases or decreases in temperature; and the weather announcement machine functions automatically to change its weather announcement when the weather forecast is received for the given geographical area on teletype or similar message equipment. Also, a manual change can be made on the time announcement machine to vary the particular advertisement being broadcast. The capacity of the family of announcement machines is 12-hour announcements and 60-minute announcements or a total of 720 combinations of time announcements, 150 temperature announcements, and 1000 weather announcements. An announcement from each announcement machine is broadcast in series as a segment of a current advertisement, time, weather, and temperature announcement.

Thus, it is an object of this invention to provide a variable announcement system for announcing an announcement including time, temperature and weather segments to a telephone system, with the message in each segment being automatically changed in response to changes in time, temperature, and weather conditions.

Another object of this invention is to provide a family of announcement systems which are coordinated with each other to provide changeable information, and which automatically change the announcements being broadcast in response to periodic and aperiodic inputs.

Another object of this invention is to provide a weather announcement system which includes a plurality of recorded announcements that correspond to a pre-coded matrix of current and forecast weather conditions, and which is responsive to a coded numerical input to change the announcement being broadcast.

Another object of this invention is to provide a weather announcing means which is compatible with a matrix of weather information and which functions to broadcast weather announcements that correspond to a signal received from a teletype or similar system and which corresponds to a selection from the matrix of weather information.

Other objects, features and advantages of the present system will become apparent upon reading the following specification when taken into conjunction with the accompanying drawing.

DESCRIPTION OF THE PREFERRED EMBODIMENTS

Figure 1A:
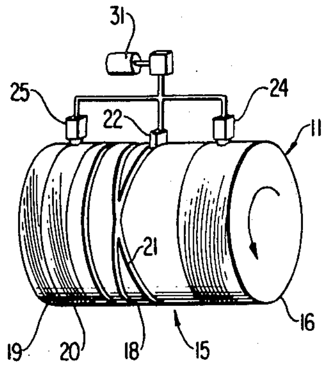
FIG. 1A, 1B, and 1C are schematic illustrations of the advertisement and time announcement cylinder, temperature announcement cylinder, and weather forecast announcement cylinder respectively.
Figure 1B:
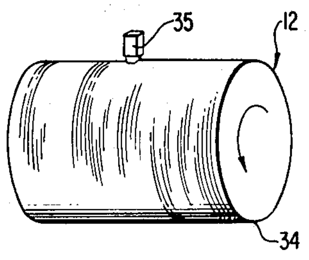
Figure 1C:
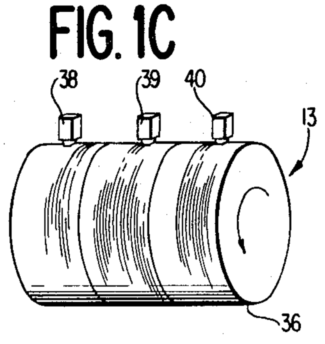

Referring now in more detail to the drawing, in which like numerals indicate like parts throughout several views, FIG. 1A schematically illustrates time announcement means or machine 11, FIG. 1B schematically illustrates temperature announcement means or machine 12, and FIG. 1C schematically illustrates weather announcement means or machine 13.

Time announcement machine 11 functions on the principle set forth in U.S. Pat. No. 2,862,065 issued Nov. 25, 1968 and comprises a rotatable announcement cylinder 15 that is separated into advertising cylinder 16, cam cylinder 18, minute cylinder 19 and hour cylinder 20. A plurality of spaced advertisement recordings are imposed in spiral paths about advertising cylinder 16, while a plurality of spaced time recordings are imposed in spiral paths on minute and hour cylinders 19 and 20. Cam cylinder 18 defines a continuous cam slot 21 and slot follower 22 engages slot 21 and, as announcement cylinder 15 rotates, slot follower follows slot 21 back and forth along the length of cylinder 15. Reading or announcing heads 24 and 25 engage advertising cylinder 16 and minute and hour cylinders 19 and 20 respectively. Slot follower 22 functions to move reading heads 24 and 25 along the length of announcement cylinder 15. The spiral arrangements of the advertisement recordings imposed upon advertising cylinder 16 are opposite from the spiral arrangement of the time recordings imposed on minute and hour cylinders 19 and 20. Thus, when slot follower 22 is moving to the left, reading head 24 functions to broadcast the advertisement announcement from a spiral track on advertising cylinder 16, and when slot follower 22 is moving to the right, reading head 25 functions to broadcast the time announcement from a pair of aligned spiral tracks on minute and hour cylinder 19 and 20. In order to change the announcement broadcast from advertising cylinder 16, advertising cylinder 16 can be manually rotated with respect to cam cylinder 18. Minute and hour cylinders 19 and 20 are automatically rotated with respect to cam cylinder 18 at a pre-determined time intervals in a manner as is set forth in greater detail in U.S. Pat. No. 2,862,065.

Figure 1D:
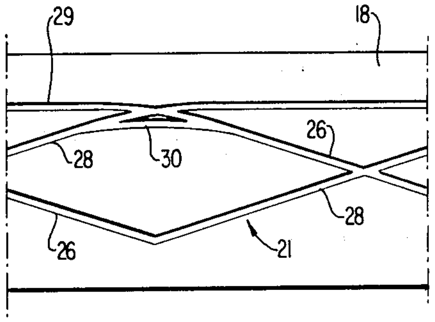
FIG. 1D is a layout of the continuous cam slot of the advertisement and time announcement cylinder of FIG. 1A.

As is best shown in FIG. 1D, cam slot 21 is continuous and comprises right spiral portion 26, left spiral portion 28 and dwell portion 29. Cross-over portion 30 connects left spiral portion 28 with right spiral portion 26. It should be noted that the three major portions of the slot 21, including right spiral portion 26, left spiral portion 28, and dwell portion 29, each extend substantially the entire circumference about cam cylinder 18, so that three complete revolutions of announcement cylinder 15 are required for slot follower 22 to travel the entire length of continuous cam slot 21.

As is schematically illustrated in FIG. 1A, spring solenoid 31 functions to bias slot follower 22 to the right or through cross over portion 30 into right spiral portion 26 of slot 21. Thus, when solenoid 31 is energized and slot follower 22 is traveling through the last portion of left spiral portion 28, slot follower 22 will be urged through cross-over portion 30 of slot 21 and will not enter dwell portion 29. This causes slot follower 22 to travel alternately through right spiral portion 26 and left spiral portion 28 without traveling through dwell portion 29.

As is shown in FIG. 1B, temperature announcement machine 12 comprises rotatable announcement cylinder 34 that has a plurality of spaced temperature recordings imposed in annular tracks on its surface. Reading or announcing head 35 normally contacts a single one of the annular tracks to broadcast the announcement recorded in that path. When the temperature changes reading head 35 is moved to the right or to the left to the next adjacent recording track which corresponds to the next higher or lower temperature reading. The principle of operation is similar to the temperature announcement machine disclosed in U.S. Pat. No. 3,161,729 issued Dec. 15, 1964.

As is illustrated in FIG. 1C, weather announcement machine 13 comprises announcement cylinder 36 and three reading or announcing heads 38, 39, and 40. Three groups of annular recordings are imposed upon the surface of announcement cylinder 36, and each reading head is arranged to broadcast a recording from one of the three groups. Each reading head 38, 39, and 40 is independently movable along the length of announcement cylinder 36 as will be explained in more detail hereinafter.

Figure 1E:
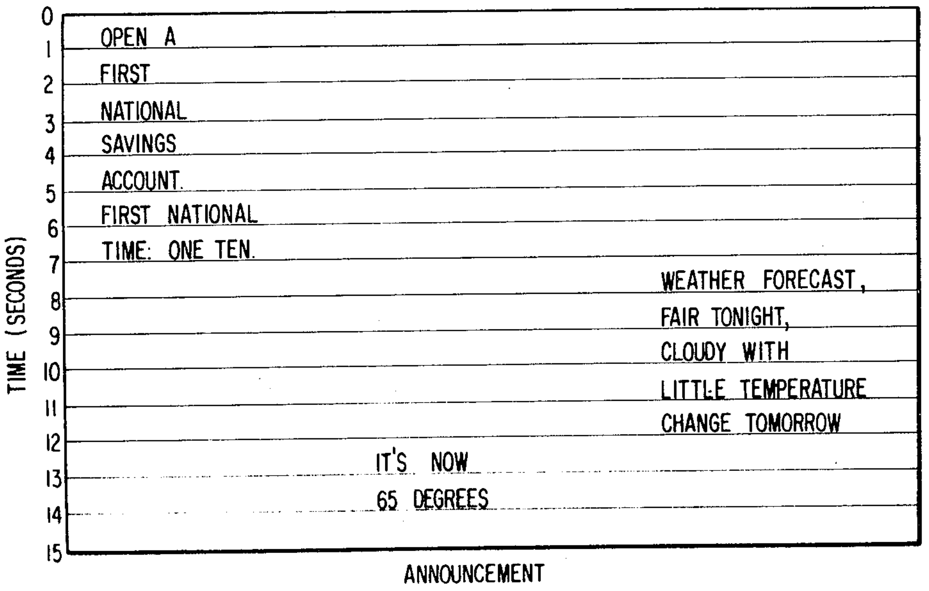
FIG. 1E is a schematic illustration of an announcement transcribed from the announcement cylinders showing the sequence in which the recordings are broadcast and time duration of the announcements.

The announcement cylinders of time announcement machine 11, temperature announcement machine 12, and weather announcement machine 13 all rotate at the same angular velocity, at 12 revolutions per minute and require 5 seconds for each revolution. As is illustrated in FIG. 1E together with FIGS. 1A, 1B, 1C, and 1D, time announcement machine 11 functions to broadcast the first announcement, weather announcement machine 13 functions to broadcast the second announcement and temperature announcement functions to broadcast the third announcement. When the announcement is to be broadcast from time announcement machine 11, slot follower 22 enters right spiral portion 26 of continuous slot 21 and reading head 24 is lowered into contact with advertising cylinder 16. This causes reading head 24 to follow a spiral track along advertising cylinder 16 and the particular announcement recorded in the spiral path is broadcast. As shown in FIG. 1E, the five seconds required for a complete revolution of announcement cylinder 15 is occupied with the advertisement announcement. At the end of the first revolution of cylinder 15, slot follower 22 will begin its travel through left spiral portion 28 of continuous slot 21 and reading head 24 will be lifted away from advertising cylinder 16 while reading head 25 will be placed in contact with minute and hour cylinders 19 and 20 and will broadcast an announcement recorded in the aligned spiral tracks on these two cylinders. The duration of the time announcement segment is substantially less than 5 seconds, usually about 2 seconds; however, left spiral portion 28 of continuous slot 21 extends substantially the entire distance about the circumference of recording cylinder 15, and slot follower 22 reaches dwell portion 29 after the second complete revolution of announcement cylinder 15.

After the time announcement has been broadcast by reading head 25, weather announcement machine 13 is timed to begin its announcement segment before the end of the second revolution of recording cylinder 15. As will be described more fully hereinafter, reading heads 38, 39, and 40 function to broadcast three announcements sequentially from the three groups of recordings imposed upon announcement cylinder 36, and the duration of the composite announcement segment is usually slightly less than 5 seconds or slightly less than one revolution of announcement cylinder 36. As announcement cylinder 36 of the weather announcement machine rotates and weather announcement machine 13 broadcasts its announcement, announcement cylinder 15 of time announcement machine 11 continues its rotation and slot follower 22 continues to pass through the end of left spiral portion 28 of slot 21 and pass into dwell portion 29. By the time weather announcement machine 13 completes its announcement segment, slot follower 22 will be approximately half-way through the dwell portion of continuous slot 21.

After weather announcement machine 13 completes its announcement segment, its reading heads 38, 39, and 40 are lifted out of contact with the surface of recording cylinder 36 for two complete revolutions. At the end of the announcement cycle of weather announcement machine 13, reading head 35 of temperature announcement machine 12 is moved into contact with the surface of its announcement cylinder 34, and the temperature is broadcast. The time required to announce the temperature is substantially less than 5 seconds, usually about 2 seconds. As the temperature is being announced, announcement cylinder 15 of time announcement machine 11 continues its rotation and slot follower 22 travels through the end of dwell portion 29 of continuous slot 21. By the time the temperature announcement segment is completed and reading head 35 is lifted out of contact with the surface of announcement cylinder 34, slot follower 22 is ready to enter right spiral portion 26 of continuous slot 21 to begin the next cycle of the series of announcement segments.

The arrangement of time, temperature and weather announcement machines 11, 12, and 13 is such that time announcement machine 11 requires approximately 1½ revolutions or about 7 seconds to broadcast its complete announcement, weather announcement machine 13 requires about one revolution or about 5 seconds to broadcast its announcement, and temperature announcement machine 12 requires about one-half revolution or about 2½ seconds to broadcast its announcement. Together, the entire announcement cycle is completed within 15 seconds.

It should be noted that the advertising portion of the recording broadcast by the time announcement machine requires approximately 5 seconds, or time for one complete revolution of all of the recording cylinders. The period when the time is transcribed from time announcement machine 11 is after the lapse of the first 5 seconds or first revolution of the recording cylinders. Thus, an announcement of time, weather, and temperature can be completed within 10 seconds or two revolutions of the recording cylinders. This allows the advertisement announcement segment to be deleted from the announcement cycle when desired. In order to shorten the announcement cycle and delete the advertisement segment of a composite announcement, spring solenoid 31 is energized which urges slot follower 22 to follow cross-over portion 30 of continuous slot 21, so that only the right spiral portion 26 and left spiral portion 28 are followed by slot follower 22. Also, reading head 24 is raised from contact with advertising cylinder 16 by the energizing of a solenoid 37 and by an appropriate mechanical linkage (not shown) and reading heads 25, 35, 38, 39, and 40 are shifted from a three-cycle mode of operation to a two-cycle mode of operation, to transcribe on every second revolution of announcement cylinders 15, 34, and 36 instead of on every third revolution, as previously described. This causes the first 5 seconds of the long announcement cycle to be deleted or skipped and the series of announcements broadcast will last for ten seconds. The shift from the long 15-second cycle to the short 10-second cycle is in response to the traffic load on the telephone system to which the announcements are broadcast, as will be described more fully hereinafter.

Figure 2:
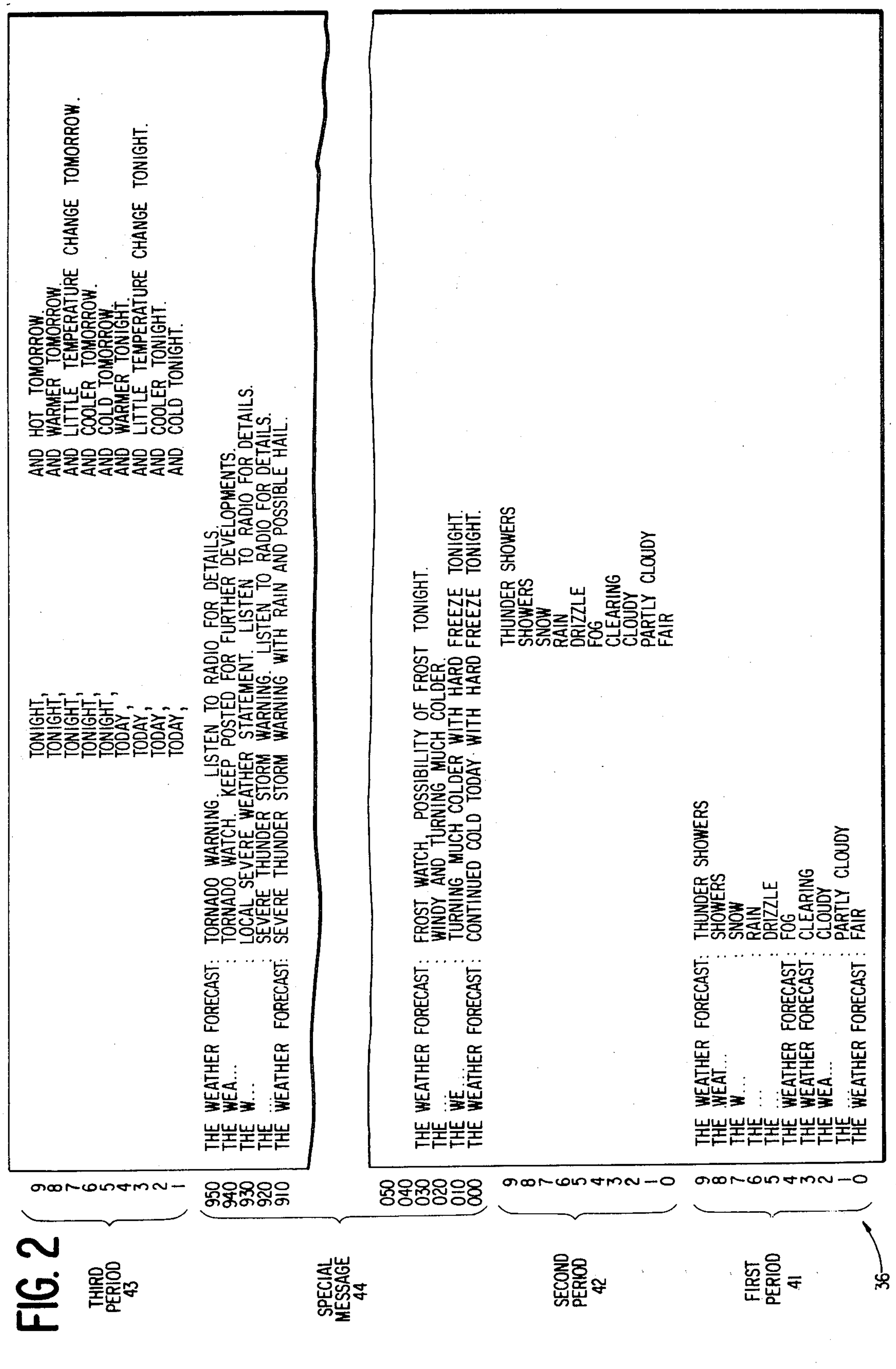
FIG. 2 is a schematic layout of the recordings imposed upon the weather forecast announcement cylinder.

As is shown in FIG. 2, announcement cylinder 36 of weather announcement machine 13 has the announcements recorded thereon in groups that correspond to the matrix developed by the U.S. Weather Bureau. Reading head 38 is arranged to broadcast the announcements numbered from zero through nine in the first group 41; reading head 39 is arranged to broadcast the announcements in the second group 42; while reading head 40 is arranged to broadcast the announcements in the third group 43. When a special message is to be transcribed, reading heads 38 and 40 are moved toward the opposite ends of announcement cylinder 36 so that they are moved beyond first and third groups of recordings, and the reading head 39 is moved from the second group 42 of recordings over to the special message group 44. With this arrangement, reading heads 38 and 40 will not function to broadcast an announcement while reading head 39 is broadcasting a long special announcement.

As is shown in FIG. 2, the recordings in the first group 41 are offset from the recordings in the second group 42, and the recordings in the third group 43 are offset from those in the first and second groups 41 and 42. Reading heads 38, 39 and 40 are in alignment with each other and are parallel to the axis of announcement cylinder 36. Thus, as announcement cylinder 36 rotates and when reading heads 38, 39 and 40 are moved into contact with the announcement cylinder, the reading heads will broadcast the announcements in sequence, the sequence being: first group 41, third group 43, second group 42, and third group 43. When the code of the announcement matrix is 222, the announcement will be: "The weather forecast: cloudy today, partly cloudy and cooler tonight." As previously described, the matrix used by the Weather Bureau has a capacity for 900 combinations or weather announcements by using the first, second, and third groups of recordings. When the last digit of the number code is changed to zero, reading heads 38 and 40 move off the first and third groups of recordings and reading head 39 moves into the special message group 44. There are enough tracks to impose 100 special messages in the special message group 44, which provides a total announcement capacity for the weather announcement machine of one thousand different announcements.

Figure 3:
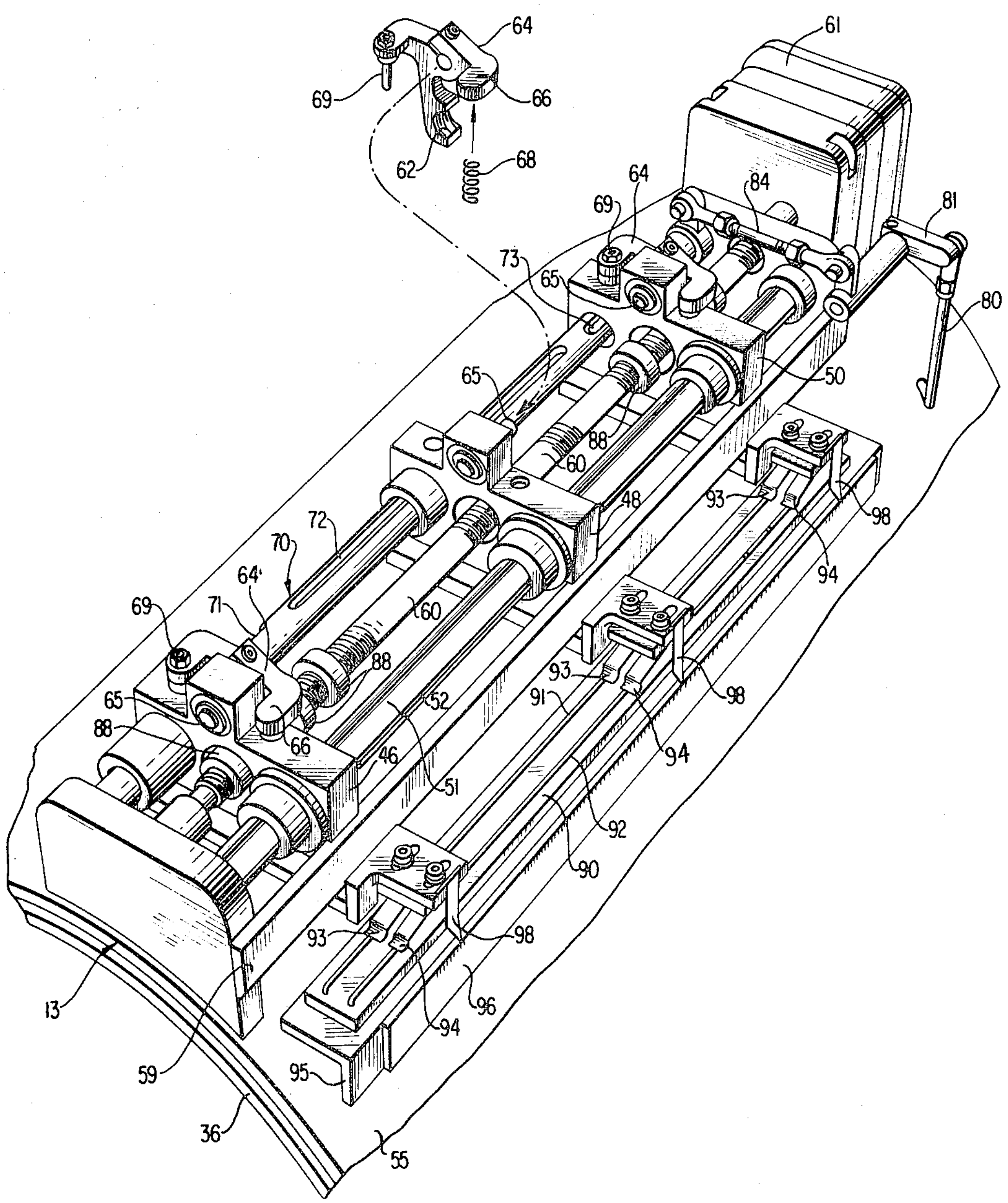
FIG. 3 is a top perspective view of the weather announcement machine with one of the half nut connectors shown in detail.
Figures 4, 7:
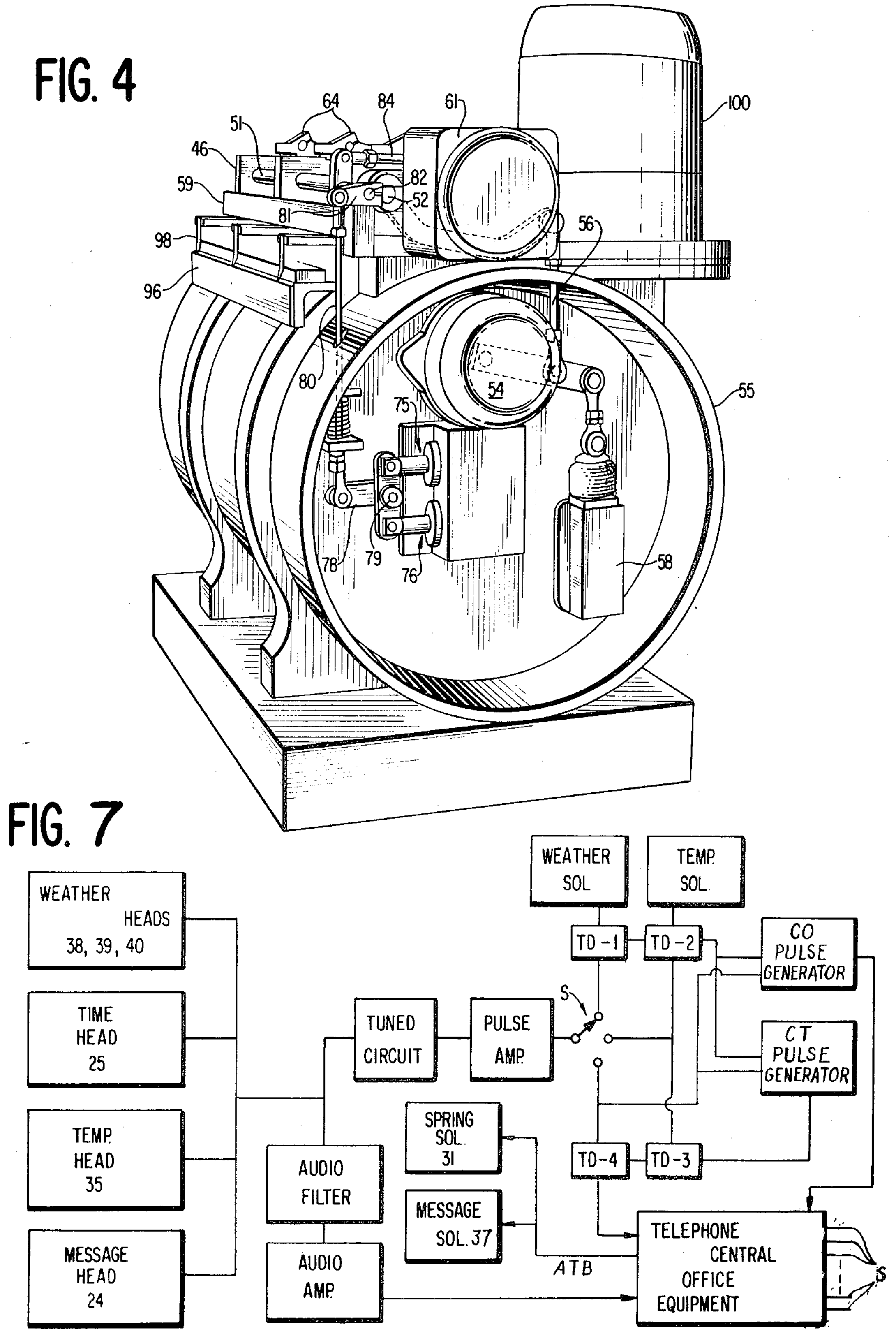
FIG. 4 is an end perspective view of the weather announcement machine.
FIG. 7 is a schematic diagram of that embodiment of the announcing system disclosed herein.

As is best shown in FIG. 3, weather announcement machine 13 comprises announcement cylinder 36 and reading head carriages 46, 48 and 50 which carry reading heads 38, 39 and 40, respectively (not shown in FIG. 3). Carriages 46, 48 and 50 are slideably connected to slide rod 51. Slide rod 51 defines slot 52 which extends along its length and each carriage 46, 48 and 50 is keyed to slot 52. Slide rod 51 is rotatable and functions to rotate carriages 46, 48 and 50 so that their reading heads 38, 39 and 40 are movable into and out of contact with announcement cylinder 36. As is shown in FIG. 4, weather head solenoid 54 is mounted on the side of housing 55 and functions to reciprocate link 56, which is connected by a crossover link (dash lines) to slide rod 52 and functions to rotate slide rod 52 through an arc of approximately 30°. A dash pot 58 is also connected to weather solenoid 54 and functions to slow the movements of link 56 and carriages 46, 48 and 50 and their respective reading heads 38, 39 and 40 when moving into contact with announcement cylinder 36. When weather head solenoid is energized, link 56 moves in an upward direction to raise carriages 46, 48 and 50 and lift reading heads 38, 39 and 40 out of contact with announcement cylinder 36.

In order to assure that each of the reading heads 38, 39 and 40 is properly oriented with respect to a particular one of the recordings, detent bar 59 is positioned adjacent carriages 46, 48 and 50 and defines a plurality of closely spaced detents (not shown) along its bottom edge which correspond in spacing to the spacing of the recordings imposed upon announcement cylinder 36. When slide rod 51 is rotated, each of the carriages 46, 48 and 50 will engage one of the detents of detent bar 59 with a feeler (not shown) which functions to center each reading head 38, 39 and 40 with a particular one of the recordings imposed on the announcement cylinder 36. A similar detent structure is disclosed in more detail in U.S. Pat. No. 3,161,729.

In order that carriages 46, 48 and 50 be moved along the length of announcement cylinder 36 to broadcast various ones of the announcements recorded on the announcement cylinder, lead screw 60 extends along the length of announcement cylinder 36 and projects through openings in each carriage 46, 48 and 50. Reversible servo motor 61 is connected to and drives lead screw 60. Each carriage 46, 48 and 50 is releaseably connected to lead screw 60 by means of a half nut 62 which is movably connected to each carriage. Each half nut 62 is an integral part of a lever 64 which is pivotally connected by axle 65 to its carriage 46, 48 or 50. One end of each lever 64 forms a presser head 66 which is urged in an upward direction by a coil compression spring 68. The other end of each lever 64 carries cam follower 69 which is urged in a downward direction by its spring 68 into engagement with rotatable slide rod 70.

Slide rod 70 defines slots 71, 72 and 73 which extend along its length. Slots 71, 72 and 73 are offset from each other about the circumference of slide rod 70. A cam follower 69 of each carriage 46, 48 and 50 is arranged to engage a slot 71, 72 or 73. Slide rod 70 is normally positioned with slot 72 facing in an upward direction and with slots 71 and 73 located on opposite sides of slot 72. This causes cam follower 69 of carriage 48 to be urged down into slot 72 by the spring 68 of the carriage and half nut 62 of carriage 48 to be in engagement with the threads of lead screw 60. In the meantime, the cam followers 69 of carriages 46 and 50 will engage the high surfaces of slide rod 70, and their half nuts 62 will be held out of engagement with lead screw 60. Thus, when lead screw 60 is rotated by servo motor 61, carriage 48 will be moved lengthwise along slide rods 52 and 60, or along the length of recording cylinder 36.

As is best shown in FIG. 4, a pair of solenoids 75 and 76 are mounted on the end of housing 55 and are arranged to rotate link 78 about pivot pin 79. Link 78 is connected to push rod 80 which extends in an upward direction and is connected to link 81 at the top of housing 55. Link 81 pivots about its pivot pin 82 and controls the movement of horizontal push rod 84, which is connected at its opposite end to link 85, and link 85 is rigidly connected to slide rod 70. The arrangement is such that when one or the other of solenoids 75 and 76 are energized, link 78, push rod 80, link 81, horizontal push rod 84, and link 85 function to rotate slide rod 70. When solenoid 75 is energized, it rotates link 78 in a clockwise direction, (FIG. 4) moves push rod 80 in an upward direction, rotates link 81 in a clockwise direction, moves horizontal push rod 84 to the right, and rotates link 85 and slide rod 70 in a clockwise direction, which functions to rotate slot 73 to the upper portion of slide rod 70 and moves slots 71 and 72 in a downward direction around slide rod 70. This allows spring 68 of carriage 50 to urge its cam follower 69 down into slot 73, thus causing the half nut 62 of lever 64 to engage lead screw 60. In the meantime, cam follower 69 of carriage 48 will have been moved in an upward direction by the movement of slot 72 from the upright position on slide rod 70, thus causing a rotation of lever 64 and its half nut 62 so that carriage 48 is disconnected from lead screw 60. When servo motor 61 is energized to rotate lead screw 60 with slide rod 70 in this position, carriage 50 will then be moved along the length of recording cylinder 36 while carriages 46 and 48 will remain stationary.

When solenoid 76 is energized, the movement of the links and push rods will be in the opposite direction from that described above, which functions to rotate slide rod 70 in the opposite direction to move slot 71 to its upright position and slots 72 and 73 down the side of slide rod 70, whereupon carriages 48 and 50 will be disconnected from lead screw 60 while carriage 46 will be connected to lead screw 60 by its half nut 62 and lever 64. The subsequent rotation of lead screw 60 will then cause carriage 46 to move along the length of the recording cylinder while carriages 48 and 50 remain stationary.

In order to prevent carriages 46, 48 and 50 from moving too far along the length of the recording cylinder 36, limit nuts 88 are connected to lead screw 60 at spaced intervals along its length. Limit nuts 88 are internally threaded and engage the threads of lead screw 60 and can be moved along the length of lead screw 65 by rotating them with respect to the lead screw. Limit nuts 88 are sized small enough so as to pass through the openings 89 of each carriage 46, 48 and 50. When a carriage is moved along the length of slide rods 52 and 70 and if the movement of the carriage is far enough so that the half nut 62 of a carriage engages a limit nut 88, the half nut will be wedged up out of the threads of lead screw 60 by the tapered shape of the threads of the half nut and by the tapered sides of the limit nut 88. This limits the movement of the carriages, and since limit nuts 88 can be placed at virtually any position along the length of lead screw 60, the area of movement of each carriage 46, 48 and 50 can be adjusted as desired. Of course, slots 71, 72 and 73 also function to limit the movement of carriages 46, 48 and 50 respectively, since when a carriage reaches the end of its slot, the cam follower 69 of the carriage will be moved to the top surface of slide rod 70, which functions to rotate the half nut 62 out of engagement with lead screw 60 and stop the movement of the carriage.

As is shown in FIG. 3 a slide wire assembly 90 is mounted on the front portion of housing 55 and comprises continuous slide wire 91 and segmented slide wire 92. Each carriage 46, 48 and 50 includes a pair of slide wire feelers 93 and 94 which slideably engage the slide wires. A constant voltage is applied to continuous slide wire 91 while a varying voltage is applied to the segments of segmented slide wires 92. The slide wire feelers 93 and 94 of each carriage 46, 48 and 50 are connected to a Wheatstone bridge assembly which detects and compares a voltage difference between the segments of slide wire 92 and continuous slide wire 91 and functions to actuate solenoid 75 or solenoid 76 or not actuate either of the solenoids and to actuate servo motor 61, to reposition one of the carriages 46, 48 or 50 until the voltage across the bridge of the carriage is balanced. This structure will be disclosed in more detail hereinafter.

Slide wire assembly 90 is mounted on an L-shaped bracket 95 at the front of housing 55, and face plate 96 is attached to the vertical leg of bracket 95. Numbers are printed on each plate 96 which represent the various recording tracks imposed upon announcement cylinder 36, and a pointer 98 is connected to each carriage 46, 48 and 50 to point to a number on face plate 96, and an observer can determine the exact recording which each recording head is transcribing or is about to transcribe as motor 100 rotates announcement cylinder 36 beneath each of the reading heads of carriages 46, 48 and 50.

It will be understood from what has been said above that the weather announcing machine 13 provides a variety of weather announcements by the selective positioning of the three weather reading heads 38, 39 and 40 relative to the weather announcement cylinder 36 in positions which correspond to the values of the digits in each particular three digit weather code. The control means by which the plurality of weather reading heads 38, 39 and 40 are positioned along the length of the weather announcement cylinder 36 in positions which correspond to the values of the digits in a three-digit weather code is shown schematically in FIGS. 5 and 6.

Figures 5, 6:
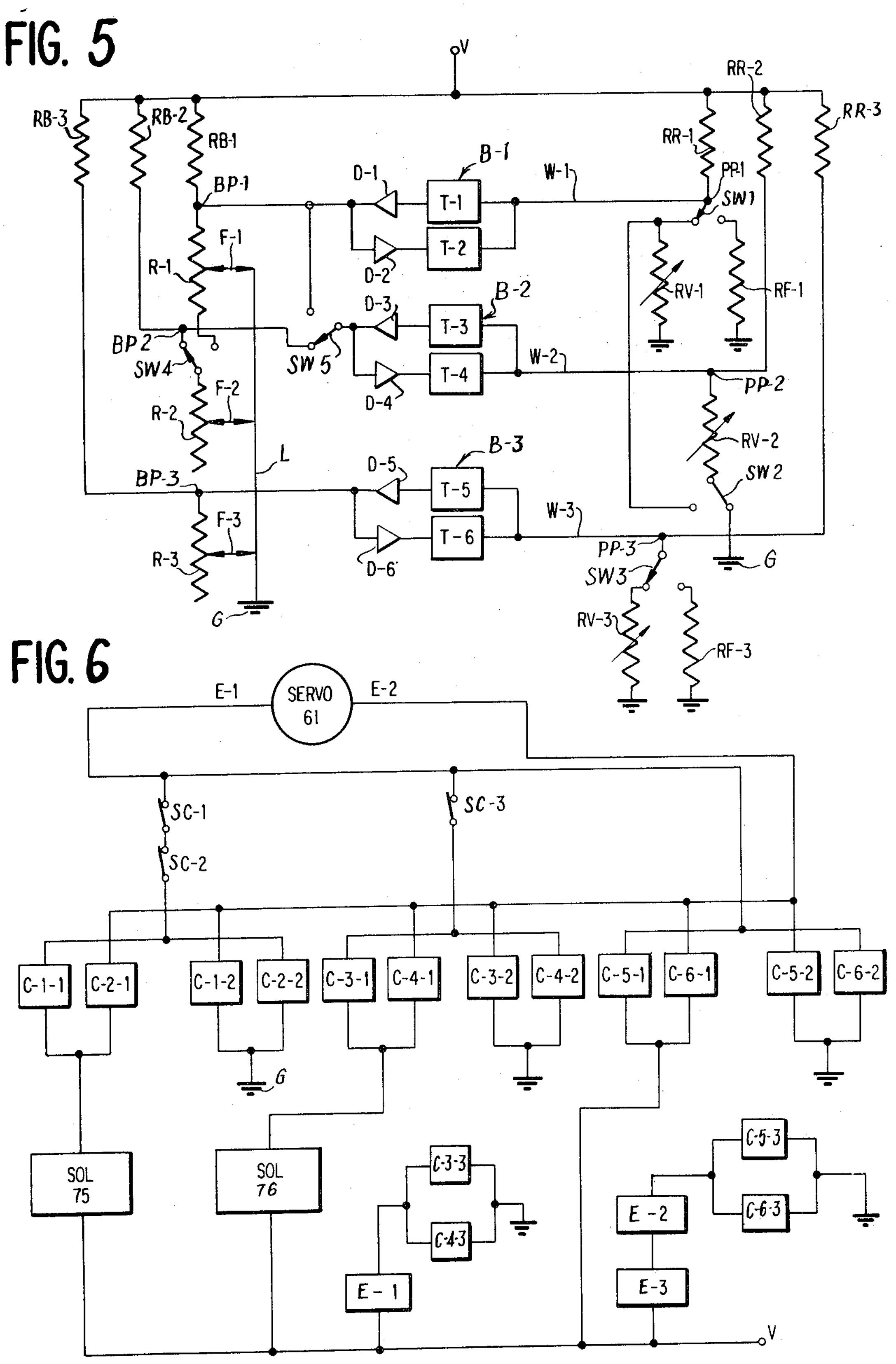
FIGS. 5 and 6 are schematic diagrams showing the announcement control means of the weather announcement machine.

In FIG. 5, the segments of the segmented slide wire 92 (FIG. 3) are shown as the resistors R–1, R–2, and R–3 and the continuous slide wire 91 as shown as the ground lead L. The three slide wire feelers 93 and 94 are shown as F–1, F–2 and F–3.

Through the slide wire feeler F–1, the resistor R–1 is in series between a voltage V and ground G with a fixed resistor RB–1. The resistance of the resistor R-1 in series with the resistor RB–1 is determined by the position of the slide wire feeler F–1. The resistor R–1 and the resistor RB–1 are in parallel between the voltage V and ground G with a fixed resistor RR–1 and a variable resistor RV–1 when a switch SW–1 in its first position as shown in FIG. 5.

Connecting a balance point BP–1 between the resistor RB–1 and the resistor R–1 and a balance point PP–1 between the resistor RR–1 and the resistor RV–1 is a switching network W–1. The switching network W–1 includes a switching device T–1 in series with a diode or similar current directional device D–1. The switching device T–1 and the current directional device D–1 are in parallel with a switching device T–2 and a second current directional device D–2.

It will now be understood that the resistors R–1, RB–1, RR–1, and RV–1 define with the switching network W–1 a conventional bridge circuit B–1 which is imbalanced by varying the position of the variable resistor RV–1 and which is restored to balance by moving the position of the slide wire feeler F–1 to change the resistance of the resistor R–1. Further, it will be understood that the current directional devices D–1 and D–2 are arranged for the flow of current in opposite directions between the balance points BP–1 and PP–1 and that as a result, the nature of the imbalance resulting from a change in the resistance of the resistor RV–1 will determine whether current flows through the switching device T–1 or the switching device T–2. The various resistance values of the variable resistor RV–1 correspond to various values of the first digit in the three-digit weather code and it is by changing the resistance of the variable resistor RV–1 so as to activate either the switching device T–1 or the switching device T–2 that the position of the first weather reading head 38 is changed.

The slide wire feeler F–2, the resistor R–2, a fixed resistor RB–2, a fixed resistor RR–2, a variable resistor RV–2, and a switching network W–2 form a conventional bridge circuit B–2 similar to the bridge circuit B–1 described above. The switching network W–2 includes a switching device T–3 in series with a current directional device D–3 and in parallel with a switching device T–4 and a current directional device D–4 between balance points BP–2 and PP–2. A switch SW–2 in its first position connects the resistor RV–2 to ground, a switch SW–4 in its first position connects the resistor R–2 to the balance point BP–2, and a switch SW–5 in its first position connects the switching network W–2 to the balance point BP–2, as shown in FIG. 5. The resistor RV–2 is varied to provide a plurality of resistance values corresponding to various values of the second digit in the three-digit weather code. Thus, it is by changing the resistance of the resistor RV–2 so as to activate either the switching device T–3 or the switching device T–4 that the position of the second weather reading head 39 is changed.

The slide wire feeler F–3, the resistor R–3, a fixed resistor RB–3, a fixed resistor RR–3, a variable RV–3, and a switching network W–3 between balance points PB–3 and PP–3 form a conventional bridge circuit B–3 similar to the bridge circuits B–1 and B–2 described above. The switching network W–3 includes switching devices T–5 and T–6 and current directional devices D–5 and D–6 arranged in substantially the same manner as the switching devices T–3 and T–4 and the current directional devices D–3 and D–4 in the bridge circuit B–2. The switch SW–3 in its first position is between the balance point PP–3 and the resistor RV–3 which is varied to provide a plurality of resistance values corresponding to various values of the third digit in the three-digit weather code. Thus, it is by changing the resistance of the resistor RV–3 so as to activate either the switching device T–5 or the switching device T–6 that the position of the third weather reading head 40 is changed.

From the foregoing description of FIG. 5, it will now be understood that the values of the three digits of the weather code determine the resistance values of the resistors RV–1, RV–2 and RV–3 respectively and that when the three-digit weather code is changed with a change in weather, the resistance value of one or more of the resistors RV–1, RV–2 and RV–3 is changed to cause an imbalance in a bridge circuit B–1, B–2, or B–3 which will continue until a slide wire feeler F–1, F–2 or F–3 has been re-positioned to change a resistance R–1, R–2 or R–3 and restore the bridge circuit B–1, B–2, or B–3 to balance. The positions of the slide wire feelers F–1, F–2 and F–3 determine and are determined by the positions of the weather announcing heads since the slide wire feelers F–1, F–2, and F–3 (93 and 94 in FIG. 3) move with the weather announcing heads 38, 39, and 40 respectively. FIG. 6 shows schematically how the activating of a switching device T–1, T–2, T–3, T–4, T–5, or T–6 moves a weather reading head 38, 39, or 40.

In FIG. 6 it is shown that activating the switching device T–1 closes normally open contacts C–1–1 in series with the solenoid 75 and with normally closed switch contacts SC–1 and SC–2 between a voltage V and the side E–1 of the servo motor 61. In addition, activating the switching device T–1 closes normally open contacts C–1–2 between the side E–2 of the servo motor 61 and ground. Thus, when the switching device T–1 is activated, it closes contacts C–1–1 and C–1–2 and as a result, the solenoid 75 and the servo motor 61 are both made operative by the voltage V which is applied to the side E–1 of the servo motor 61 while ground is applied to the side E–2.

The making of the solenoid 75 operative causes the half nut 66 to be brought into engagement with the lead screw 60 which is rotated by the servo motor 61 in that rotational direction determined by the application of the voltage V to the side E–1 of the servo motor 61. This causes the weather reading head and the slide bar feeler F–1 to move along the length of the weather announcing drum until the resistance value of the resistor R–1 is such that the bridge circuit B–1 is restored to balance and the weather reading head is in a new position determined by the resistance value of the resistor RV–1.

When the switching device T–2 is activated, it closes normally open contacts C–2–1 which are in series with the solenoid 75 between the voltage V and the side E–2 of the servo motor 61 and it closes normally open contacts C–2–2 which are in series with the normally closed switch contacts SC–1 and SC–2 between the side E–1 of the servo motor 61 and ground G. As a result, when the resistance value of the resistor RV–1 is such as to cause a switching device T–2 to be activated rather than the switching device T–1, the solenoid 75 and servo motor 61 are also made operative. However, the voltage V is applied to the side E–2 of the servo motor 61 rather than to the side E–1 so that the servo motor 61 rotates the lead screw 60 in the opposite rotational direction from that rotational direction which results from activating the switching device T–1. Thus, the switching devices T–1 and T–2 serve together to provide motion of the weather announcing head 38 in either of two directions along the length of the weather announcing drum with the direction and the amount of motion of the weather announcing head 38 depending upon the resistance value of the resistor RV–1 corresponding to each particular value of the first digit in the three-digit weather code.

When activated, the switching devices T–3 and T–4 close normally open contacts C–3–1 and C–3–2 and C–4–1 and C–4–2 respectively which are arranged with normally closed contacts SC–3, the solenoid 76, and the sides E–1 and E–2 of the servo motor 61 in substantially the same manner as the contacts of the switching devices T–1 and T–2 are arranged with the normally closed contacts SC–1 and SC–2, the solenoid 75, and the sides E–1 and E–2 of servo motor 61. Thus, when a resistance value of the resistor RV–2 causes an imbalance of the bridge circuit B–2, the solenoid 76 is made operative to cause the lead screw 60 to be engaged with the half nut 65 and servo motor 61 is made operative to cause rotation of the lead screw 60 in the rotational direction determined by whether the resistance value of the resistance RV–2 causes the switching device T–3 or the switching device T–4 to be activated. In this manner, the switching devices T–3 and T–4 serve together to provide motion of the weather announcing head 39 in response to the resistance value of the resistor RV–2 as determined by the second digit in the three-digit weather code.

When activated, the switching devices T–5 and T–6 close normally open contacts C–5–1 and C–5–2 and C–6–1 and C–6–2 respectively which are arranged with the sides E–1 and E–2 of the servo motor 61 in substantially the same manner as the contacts of the switching devices T–1 and T–2 are arranged with the sides E–1 and E–2 of the servo motor 61. Thus, when a resistance value of the resistor RV–3 causes an imbalance of the bridge circuit B–3, the activating of a switching device T–3 or T–4 makes the servo motor 61 operative and causes rotation of the lead screw 60 in that particular rotational direction which serves to make the position of the weather announcing head 40 responsive to the resistance value of resistor RV–3 as determined by the third digit in the three-digit weather code.

It will be understood that activating the switching device T–5 or the switching device T–6 does not make a solenoid such as the solenoid 75 or the solenoid 76 operative. This is because the half nut 64 which engages the lead screw 60 to move the weather announcing head 40 continuously engages the lead screw 60 except when solenoid 75 and 76 is operative. In addition, it will be understood from FIG. 5, that when activated, the switching devices T–5 and T–6 close normally open contacts C–5–3 and C–6–3 respectively. The contacts C–5–3 and C–6–3 are in parallel with each other and in series with relays E–2 and E–3. When energized, the relay E–2 opens the normally closed contacts SC–2 and the relay E–3 opens the normally closed contacts SC–3. The opening of the normally closed contacts SC–2 and SC–3 prevents the solenoids 75 and 76 and the servo motor 61 from being made operative in responsive to resistance values of the resistors RV–1 and RV–2 when the servo motor 61 is responding to a resistance value of the resistor RV–3.

Similarly, when activated, the switching devices T–3 and T–4 close normally open contacts C–3–3 and C–4–3 respectively in parallel with each other and in series with a relay E–1. When energized, relay E–1 opens normally closed contacts SC–1 and serves to make the solenoid 75 and the servo motor 61 inoperative in response to changes in the resistance value of the resistor RV–1 when the servo motor 61 is responding to a resistance value of the resistor RV–2. Thus, the relays E–1, E–2 and E–3 serve to sequence the response of the solenoids 75 and 76 and of the servo motor 61 to the imbalancing of the bridge circuits B–1, B–2, and B–3 so that the balancing the bridge circuit B–3 takes priority over the balancing of the bridge circuits B–1 and B–2, the balancing of the bridge circuit B–2 takes priority over the balancing of the bridge circuit B–1, and the bridge circuit B–1 is balanced only if the bridge circuits B–2 and B–3 are in balance. In terms of the three-digit weather code, the relays E–1, E–2 and E–3 serve to cause the weather reading heads 38, 39, and 40 to be properly positioned along the length of the weather announcing drum in sequence and as determined by the values of the third, second and first digits of the three-digit weather announcing code.

It will be understood from what has been said above that when the third digit in the weather announcing code is a zero, the weather announcing code is one of the emergency weather codes and the entire weather segment is special weather message taken from the special portion of the weather announcing drum. In order to position the weather announcing heads 38, 39 and 40 to provide for special weather messages, the zero value of the third digit in the three-digit weather code is provided by changing the positions of the switches SW–1, SW–2, SW–3, SW–4, and SW–5 which are conveniently the contacts of a single switching device.

From FIG. 5, it will be seen that changing the position of the switch SW–1 causes the resistor RV–1 to be replaced by the fixed resistor RF–1 in the bridge circuit B–1, changing the position of the switch SW–3 causes the resistor RV–3 to be replaced by the fixed resistor RF–3 in the bridge circuit B–3, changing the position of the switch SW–2 causes the resistor RV–1 to be placed in series with the resistor RV–2 in the bridge circuit B–2, and changing the positions of the switches SW–4 and SW–5 causes the resistor R–1 to be placed in series as a fixed resistor with the resistor R–2 in the bridge circuit B–2. The resistance value of the fixed resistor RF–1 is such that the imbalance of the bridge circuit B–1 causes the weather announcing head 38 to be driven beyond the end of that portion of the weather announcing drum which the weather announcing head 38 normally traverses before a resistance of the resistor R–1 restores the bridge circuit B–1 to balance.

Similarly, the resistance value of the fixed resistor RF–3 causes an imbalance of the bridge circuit B–3 which is such that the weather announcing head 40 is moved to a position beyond that portion of the weather announcing drum which the weather announcing head 40 normally traverses before a resistance value of the resistor R–3 restores the bridge circuit B–3 to balance. The result of the resistors RF–1 and RF–3 is that the weather announcing heads 38 and 40 are removed from operative position along the length of the weather announcing drum when the positions of the switches SW–1, SW–2, SW–3, SW–4, and SW–5 are changed in response to the last digit in the three-digit weather code having a value of zero.

The placing of the resistors RV–1 and RV–2 in series and of the slide wire resistors R–1 and R–2 in series provides a bridge circuit B–2 in which the resistances are such that the range of motion of the weather announcing head 39 is along the special portion of the weather announcing drum having the special weather messages. The particular position of the weather announcing head 39 along the special portion of the weather announcing drum is fixed by the resistances of the resistors RV–1 and RV–2 corresponding to the values of the first two digits in each emergency weather code and by the balancing of the bridge circuit B–2 with the variable resistance of the resistor R–2 supplemented by the resistance of the resistor R–1.

The sequence of announcement segments and the duration of the composite announcement are determined in that embodiment of the announcing system disclosed herein by: the angular positions of the announcement cylinders in the time, weather and temperature announcing means relative to each other; by cam slot 21 in cam cylinder 18; and by appropriate electrical circuitry such as that schematically shown in FIG. 5. From what has been said above, it will be understood that the announcement cylinders in the time announcing means, temperature announcing means, and weather announcing means are each driven by synchronous motors so that all of the announcing drums are continuously and simultaneously rotating at the same rotational speed and so that each announcement cylinder makes a complete revolution in approximately 5 seconds.

Each complete revolution of the plurality of announcement cylinders in approximately 5 seconds defines an operating cycle of the announcing system and from what has been said above, it will be understood that a complete announcement including advertising, time, weather and temperature segments must occur during the three successive operating cycles required for cam follower 22 to traverse the entire length of cam slot 21 in the cam cylinder 18. The first of these three operating cycles is conveniently designated as Cycle I and corresponds to that complete revolution of the plurality of announcement cylinders during which cam follower 22 is in the right spiral portion 26 of slot 21. The second of the three operating cycles is conveniently designated as Cycle II and corresponds that complete revolution of the plurality of announcement cylinders during which cam follower 22 is in the left spiral portion 28 of slot 21. The last of these three operating cycles is conveniently designated as Cycle III and corresponds to that complete revolution of the plurality of announcement cylinders during which cam follower 22 is in the dwell portion 29 of the slot 21.

The total interval of time provided by Cycles I, II, and III is 15 seconds and it will be understood from what has been said above that the advertising announcement segment which is approximately 5 seconds duration normally occurs during Cycle I. Similarly, it will be understood that the time announcement segment is approximately 2½ seconds duration and normally occurs during the first half of Cycle II; the weather announcement segment of approximately 5 seconds duration normally occurs during the second half of Cycle II and the first half of Cycle III; and the temperature segment of approximately 2½ seconds duration normally occurs during the last half of Cycle III.

To provide for the occurrence of the various announcement segments in Cycles I, II, and III as described above, time hour and minute cylinders 19 and 20, advertising cylinder 16, temperature announcement cylinder 34 and the weather announcement cylinder 36 are placed in appropriate angular positions relative to each and to cam cylinder 18. Thus, the angular position of the time announcement cylinder 15 is such that the approximate time segment is under time reading head 25 during the first half of Cycle II and the angular position of the weather announcement cylinder is such that the appropriate weather segment is under the weather reading heads 38, 39 and 40 during the second half of Cycle II and the first half of Cycle III. Similarly, the angular position of the temperature announcement cylinder 34 is such that the appropriate temperature segment is under the temperature reading head 35 during the second half of Cycle III, and the angular position of the advertisement announcing cylinder 16 is such that the appropriate advertising segment is under the advertisement reading head 24 during Cycle I.

As shown in FIG. 5, the plurality of reading heads 24, 25, 35, 38, 39 and 40 are continuously connected through an audio filter and audio amplifier to provide an audio output to telephone central office equipment. Thus, it will be understood that the particular announcement segment delivered to the telephone central office equipment during a Cycle I, II, or III will depend not only upon angular positions of the announcement cylinders relative to each other but also upon which reading head is brought into operative contact with which announcement cylinder at various times during Cycles I, II, and III. In terms of the composite announcement described above and the occurrence of its segments, this requires that the reading head 24 be brought into operative contact with the advertisement announcement cylinder 16 during Cycle I, that the time reading head 25 be brought into operative contact with the time announcement cylinders 19 and 20 during the first half of Cycle II, that the weather reading heads 38, 39 and 40 be brought into operative contact with the weather announcement cylinder 36 during the second half of Cycle II and the first half of Cycle III, and that the temperature reading head 35 be brought into operative contact with the temperature announcement cylinder 34 during the last half of Cycle III.

The cam cylinder 18 and a circuit such as that shown schematically in FIG. 5 serve to place the plurality of reading heads in operative contact with the plurality of announcement cylinders. Thus, as described above, cam cylinder 18 places advertisement reading head 24 over the appropriate recording track on the advertising announcement cylinder during Cycle I because the cam follower is in the right spiral portion 26 of the slot 21. Similarly, the cam cylinder 18 places the time reading head over the appropriate recording track on the time announcement cylinder during the first half of Cycle II because the cam follower is in the left spiral portion of slot 21.

The time segment occurs only in the first half of Cycle II, and during all of Cycle III cam cylinder 18 prevents both reading heads 24 and 25 from being in operative contact with any recording tracks on the advertising and time announcement cylinders. However, recorded on the time announcement cylinder 20 immediately following each time announcement segment is a triggering tone such as a 45,000-cycle tone which is fed by time reading head 25 through a tuned circuit to a pulse amplifier as shown in FIG. 5. The audio filter prevents the 45,000-cycle tone from passing to the audio amplifier and into the audio output of the announcing system and the tuned circuit serves to insure that only the 45,000-cycle tone reaches the pulse amplifier.

The pulse amplifier provides a pulse output in response to each 45,000-cycle tone following a time segment on the time announcing drum and as a result, there is an output pulse from the pulse amplifier which is at the end of each time segment and which occurs at approximately the middle of Cycle II. Under normal operating conditions for the announcing system, each pulse output from the pulse amplifier is fed to a time delay circuit shown as TD-1 in FIG. 5. The time delay circuit TD-1 is a conventional circuit constructed and arranged to energize the weather solenoid throughout a 5-second interval and to generate an output pulse at the end of the 5-second interval. The energizing of the weather solenoid for the five second interval causes the three weather reading heads 38, 39 and 40 to be brought into operative contact with the weather announcement cylinder 36 so that the appropriate weather segment of the composite announcement is passed by the weather reading heads 38, 39 and 40 to the telephone central office equipment during the second half of Cycle II and the first half of Cycle III.

The output pulse provided by the time delay circuit TD-1 at the end of a 5-second interval is fed from time delay circuit TD-1 to a time delay circuit shown as TD-2 in FIG. 5. The time delay circuit TD-2 is also a conventional circuit constructed and arranged to energize the temperature solenoid for a 2½-second interval and to generate an output pulse at the end of the 2½ second interval. The energizing of the temperature solenoid causes temperature reading head 35 to be brought into operative contact with the temperature announcement cylinder 34 so that the appropriate temperature segment is passed by the temperature reading head 35 to the telephone central office equipment during the last half of Cycle III.

The pulse output from the time delay circuit TD-2 at the end of the 2½-second interval is fed to CO pulse generator and a CT pulse generator as shown in FIG. 5. The CO pulse generator serves to provide a CO pulse to the telephone central office equipment which is operative in accordance with known telephone art to cause subscriber lines S connected to the announcing system by the telephone central office equipment to be disconnected. The CT pulse generator provides a CT pulse to the telephone central office equipment which is operative in accordance with known telephone art to cause subscriber lines S waiting to be connected to the announcing system by the telephone central office equipment to be connected. It will be understood that the circuit arrangement of the CO pulse generator and the CT pulse generator is such that the CT pulse follows the CO pulse with a sufficient delay for the telephone central office equipment to achieve the disconnecting of subscriber lines S connected to the announcing system and the connecting of waiting subscriber lines S.

It will also be understood that if there is no waiting subscriber line S waiting to be connected to the announcing system upon the occurrence of a CT pulse, no subscriber line S will be connected to the announcing system until Cycles I, II, and III have been once again completed and another CT pulse is generated. Thus, the announcing system operates to provide a CT pulse which connects one or more waiting subscriber lines S to the announcing system, to provide a 15-second announcement to those subscriber lines S, if any, connected to the announcing system by the CT pulse, and to provide a CO pulse which disconnects any subscriber lines S connected to the announcing system.

Conventional telephone central office equipment will generally permit a plurality of subscriber lines S to be simultaneously connected to the announcing system upon the occurrence of each CT pulse and to be simultaneously disconnected from the announcing system upon the occurrence of a subsequent CO pulse. Thus, with the arrangement of the telephone central office equipment to provide for the connecting of all of the waiting subscriber lines S simultaneously to the announcing system upon the occurrence of each CT pulse, the maximum delay which will be experienced by any subscriber before being connected to the announcing system will be 15 seconds. This will be the delay for the subscriber who reaches the telephone central office equipment immediately after the occurrence of a CT pulse. However, where the number of telephone subscribers attempting to be connected to the announcing system during an interval of time is such that the waiting subscriber lines S are in excess of that number which the telephone central office equipment will connect to the announcing system upon the occurrence of a CT pulse, some subscribers attempting to reach the announcing system will receive an irritating busy signal.

In order to minimize the occurrence of a busy signal during periods of heavy use of the announcing system, the announcing system provides for shortening the interval between subsequent CT pulses from 15 seconds to 10 seconds so that three groups of waiting subscriber lines S may be connected to the announcing system with a CT pulse during a thirty second interval rather than only two groups of waiting subscriber lines S. This shortening of the interval between subsequent CT pulses is in response to an all-trunks-busy signal (ATB) provided by the telephone central office equipment in the conventional manner and requires that the duration of the announcement be shortened from 15 seconds to 10 seconds.

The manner in which the announcing system responds to an all-trunks-busy signal from the telephone central office equipment is shown schematically in FIG. 5 where it will be seen that an all-trunks-busy signal serves to energize spring solenoid 31 which causes cam slot follower 22 to travel through bypass portion 30 of continuous cam slot 21 and bypass the dwell portion 29 of the slot. The all-trunks-busy-signal also serves to energize the advertisement reading head solenoid 37 which causes the advertisement reading head to move out of operative contact with the advertisement announcement cylinder. The bypassing of the dwell portion 29 of the slot 21 because of the energizing of spring solenoid 31 effectively eliminates Cycle III as described above as an operating cycle and in the absence of the operation of advertisement reading head solenoid 37, the advertising segment of the announcement, the temperature segment, and the second half of the weather segment would all occur in Cycle I which now follows Cycle II. However, the energizing of the advertising announcement solenoid 37 prevents the advertising segment of the announcement from occurring during Cycle I and leaves Cycle I available for the second half of the weather segment and the temperature segment.

Thus, the operation of the announcing system in response to an all-trunks-busy signal (ATB) provides a time announcement during the first half of Cycle II and a 45,000-cycle tone at the middle of Cycle II to cause the occurrence of the weather segment during the second half of Cycle II and the first half of Cycle I and of the temperature segment during the second half of Cycle I. The CO and CT pulses occur between the end of Cycle I and the beginning of Cycle II so the subscriber lines are disconnected from the announcing system at the end of Cycle I and are connected to the announcing system at the start of Cycle II.

The result of the elimination of Cycle III as defined by the dwell portion 29 of cam slot 21 is that each CT pulse is followed by an announcement which is of only 10 seconds duration because of the elimination of the 5-second advertising segment of the announcement. This short announcement requiring only Cycles I and II continues as long as the all-trunks-busy signal is provided to the announcing system from the telephone central office equipment. As soon as the number of subscriber lines S attempting to reach the announcing system is no longer greater than the number which the telephone central office equipment is arranged to connect to the announcing system and the all-trunks-busy signal is removed from the announcing system, spring solenoid 31 and the advertisement reading head solenoid 37 are de-energized and the announcing system returns to its normal announcement of 15 seconds duration utilizing Cycles I, II, and III in sequence.

The announcing system disclosed here not only provides for the elimination of a segment of the announcement in order to shorten the duration of the announcement, but it also provides for the selective elimination of the weather segment or the temperature segment of the announcement in the event of a malfunction of the weather announcing means or the temperature announcing means. This is achieved by the rotary switch S which is shown in FIG. 5 and which in its first alternate position causes the output pulse from the pulse amplifier to bypass the time delay circuit TD–1 and in its second alternate position causes the output pulse from the pulse amplifier to bypass both the time delay circuit TD–1 and the time delay circuit TD–2.

When the rotary switch S is in its first alternate position and the time delay circuit TD–1 is being bypassed, the weather solenoid is not energized and no weather segment is fed from the weather announcing head through the audio filter and the audio amplifier to the telephone central office equipment. Rather, the output pulse from the pulse amplifier passes directly to the time delay circuit TD–2 to energize the temperature solenoid and as a result, the temperature segment occurs in the second half of Cycle II. At the end of the 2½ seconds required for the temperature segment, the time delay circuit TD–2 provides an output pulse to the CO pulse generator and the CT pulse generator. However, when the switch S is in its first alternate position, this output pulse from the time delay circuit TD–2 is occurring at the end of Cycle II rather than at the end of Cycle III. As a result, the CO pulse causes subscriber lines S connected to the announcing system to be disconnected from the announcing system at the end of Cycle II.

In order to prevent waiting subscriber lines S from being connected to the announcing system at the beginning of Cycle III in which there is now no announcement segment because of the elimination of the weather segment of the announcement, the pulse output from the pulse amplifier when the switch S is in its first alternate position energizes a time delay circuit TD–3 which serves to delay the CT pulse from the CT pulse generator for five seconds. Thus, although subscriber lines S are disconnected from the announcing system at the end of Cycle II, waiting subscriber lines S are not connected to the announcing system until the beginning of Cycle I. This prevents waiting subscriber lines S from being connected to the announcing system at a time which would result in subscribers having to wait for 5 seconds for the completion of Cycle III before hearing the advertising segment of the announcement at the beginning of Cycle I.

In its second alternate position, the switch S bypasses both the time delay circuit TD–1 and the time delay circuit TD–2 so that the output pulse from the pulse amplifier is not fed to either the weather solenoid or the temperature solenoid. Thus, the weather reading heads and the temperature reading head are not brought into operative contact with their related announcement cylinders to feed the weather segment and the temperature segment of the composite announcement to the telephone central office equipment through the audio filter and the audio amplifier. Rather, the output pulse from the pulse amplifier is fed directly to the CO pulse generator and the CT pulse generator.

The feeding of the output pulse from the pulse amplifier to the CO pulse generator causes the CO pulse to the telephone central office equipment in the middle of Cycle II so as to disconnect subscriber lines S from the announcing system upon termination of the time segment of the announcement. The feeding of the CT pulse to the telephone central office equipment immediately after the CO pulse in the middle of Cycle II would result in waiting subscriber lines S being connected to the announcing system for the remainder of Cycle II and for all of Cycle III even though no announcement segment is being fed to the telephone central office equipment during the second half of Cycle II and throughout Cycle III when the switch S is in its second alternate position.

Accordingly, when the switch S is in its second alternate position, the output pulse from the pulse amplifier is fed to a time delay circuit TD–4 as well as to the CO pulse generator and the CT pulse generator. The time delay circuit TD–4 delays the CT pulse from the CT pulse generator for approximately 7.5 seconds or for the duration of the second half of Cycle II and all of Cycle III. Thus, a CT pulse is not fed to the telephone central office equipment until the beginning of Cycle I at which the advertising segment of the announcement will occur. Thus, as with the time delay circuit TD–3, the time delay circuit TD–4 serves to prevent a subscriber line S being connected to the announcing system until the beginning of Cycle I provides an announcement to be heard by a subscriber.

It will now be understood that upon the malfunctioning of the weather announcing means or the temperature announcing means, a segment of the announcement may be removed from the announcement without causing an apparent gap in the announcement and while still maintaining the three cycle sequence of operation of the announcing system provided by cam cylinder 18. This is accomplished by delaying the CT pulse by an amount equal to the duration of the segment of the announcement deleted. Thus, while the operation of the switch S does not shorten the operating cycle of the announcing system in the same manner as the response of the announcing system to an all-trunks-busy signal (ATB) from the telephone central office equipment, it does permit the selective removal of announcement segments while preserving an intelligible announcement.

While this invention has been described in detail with particular reference to preferred embodiments thereof, it will be understood that variations and modifications can be effected within the spirit and scope of the invention as described hereinbefore and as defined in the appended claims.

We claim:

1. Apparatus for delivering a first recorded message and a second recorded message wherein said messages are recorded on a movable recording medium and wherein message read head means is traversed in a first direction along said movable recording medium for delivery of the first message and is traversed in a second direction along said movable recording medium for delivery of the second message, comprising:
 first movement means operative in response to movement of said recording medium for traversing said head means in the first direction along said movable recording medium, for delivery of the first message;
 second movement means operative in response to movement of said recording medium for traversing said head means in the second direction along said movable recording medium, for delivery of the second message; and
 third movement means selectively operative in response to movement of said recording medium to maintain said head means in nontraversing relation with said moving recording medium.

2. Apparatus as in claim 1, further comprising:
 read head traverse means operatively associated with said head means and operative in response to said first movement means, said second movement means, and said third movement means for selectively traversing said head means in either of said directions along said recording medium.

3. Apparatus as in claim 2, further comprising:
 control means operatively associated with said traverse means to enable said traverse means to be selectively responsive to said third movement means to maintain said head means in said nontraversing relationship.

4. Apparatus as in claim 2, wherein:
 said first movement means, second movement means, and third movement means are disposed to interconnect with each other at certain locations relative to said recording medium; and
 said traverse means is operative to transfer from operative relation with said first movement means to operative relation with said second movement means at a first interconnection location, and is additionally selectively operative to transfer from operative relation with said second movement means to operative relation with said third movement means at a second interconnection location.

5. Apparatus as in claim 4, further comprising:
 control means operatively associated with said traverse means,
 said control means being selectively operable to a first state to cause said traverse means to transfer from operative relation with said second movement means to operative relation with said third movement means at said second interconnection location, and selectively operable to a second state to cause said traverse means to transfer from operative relation with said second movement means to operative relation with said first movement means at said second interconnection location.

6. Apparatus as in claim 2, wherein:
 said movable recording medium comprises rotatable recording means having said first message recorded on at least one track disposed on said recording means to spiral in a first direction and having said second message recorded on at least one track disposed on said recording means to spiral in a second direction;
 said first movement means comprises a first spiral guide means defined on said recording means in predetermined spatial relation thereon with respect to said first message spiral track;
 said second movement means comprises a second spiral guide means defined on said recording means in predetermined spatial relation thereon with respect to said second message spiral track and interconnected with said first spiral means;
 said third movement means comprises third guide means defined in dwell relation on said recording;
 said head traverse means comprises follower means operative to follow along said guide means; and
 said follower means is operatively connected to said head means to move said head means in message transducing relation with said first and second message spiral tracks, respectively.

7. Apparatus as in claim 6, wherein:
 said second spiral guide means has an exit end, said first spiral guide means has an entry end disposed adjacent said exit end of said second spiral guide means, and said third guide means has an access portion which is common to both said second spiral guide means exit end and said first spiral guide means entry end.

8. Apparatus as in claim 7, further comprising:
 control means operatively associated with said follower means and selectively operable to bias said follower means in a first direction causing said follower means to enter said third guide means access portion following departure of said follower means from said second spiral guide means exit end, and to bias said follower means in a second direction causing said follower means to enter said first spiral guide means entry end following departure of said follower means from said second spiral guide means exit end.

9. In an apparatus for announcing time and advertisements or the like wherein a recording cylinder has the time announcements recorded in a series of spiral tracks on its surface at one of its ends and the advertisements recorded in reverse spiral tracks on its surface at its other end and reading heads are moveable along the length of the cylinder as the cylinder rotates to transcribe the announcements from the spiral tracks, the improvement therein of an endless slot defined in the surface of the recording cylinder intermediate the ends of the cylinder, and a slot follower inserted into said slot and connected to said transcribing heads to move to the transcribing heads along the length of the recording cylinder, said endless slot comprising a first portion extending about substantially the entire circumference of said recording cylinder and shaped in a spiral along the length of the recording cylinder in one direction, a second portion extending about substantially the entire circumference of said recording cylinder and shaped in a reverse spiral along the length of the recording cylinder in the other direction, and a third portion extending substantially the entire circumference of said recording cylinder and shaped to extend substantially in a plane normal to the longitudinal axis of said recording cylinder, whereby when said recording cylinder rotates said slot follower moves said reading heads in one direction along the length of the recording cylinder during one rotation of the recording cylinder, moves the reading heads in the opposite direction along the length of the recording cylinder during the second rotation of the recording cylinder, and maintains the reading heads stationary during the third rotation of the recording cylinder.

* * * * *

UNITED STATES PATENT OFFICE
CERTIFICATE OF CORRECTION

Patent No. 3,673,344 Dated June 27, 1972

Inventor(s) Leary W. Smith et al

It is certified that error appears in the above-identified patent and that said Letters Patent are hereby corrected as shown below:

On the cover sheet insert -- [73] Assignee The Audichron Company, Atlanta, Ga. --.

Signed and sealed this 19th day of December 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334.